UNITED STATES PATENT OFFICE.

ALBERT EDWARD GESSLER, OF CLIFTON, NEW YORK.

MONOAZO DYE.

1,033,310.  Specification of Letters Patent.  Patented July 23, 1912.

No Drawing.  Application filed October 31, 1910. Serial No. 590,081.

*To all whom it may concern:*

Be it known that I, ALBERT EDWARD GESSLER, a subject of the German Empire, residing at Clifton, in the county of Richmond and State of New York, have invented new and useful Improvements in the Manufacture of Monoazo Dye, of which the following is a specification.

My invention consists in the production of a new mono-azo coloring matter which is especially valuable in consequence of its practical insolubility in oil and water which can be used in the manufacture of printing ink lakes, paints, colored papers and in dyeing and in calico printing without sublimation.

My new dye may be produced by combining diazotized alpha-naphthylamin with the salts of 2:7-naphthol-mono-sulfonic acid. In the form of its alkali salts it is to some extent soluble in hot water. In the form of its free acid it is practically insoluble in water. In the form of its lakes or salts as those with aluminum, barium, calcium, lead or the like it has a brilliant deep claret or maroon color, and is practically insoluble in water, oil, benzol or varnish, and practically insensible to the action of light and heat and it does not sublime as many of the insoluble azo dyes do.

The new mono-azo-dye is further characterized by the reaction with concentrated sulfuric acid, in which, it is soluble with a dark blue color. On suitable treatment with reducing agents it will yield alpha-naphthylamin and amino-2-naphthol-7-sulfonic acid.

The following formula will show the manner in which my invention is carried out and my new coloring matter obtained.

Example: Dissolve about twelve (12) parts of alpha-naphthylamin in a solution of twenty-five (25) parts of hydrochloric acid of about 20° Bé. strength in three hundred (300) parts of hot water. Cool down with ice to about 0° centigrade and slowly introduce therein a solution of seven (7) parts of sodium nitrate dissolved in about two hundred (200) parts of water at 0° centigrade; stir for about half an hour, filter it and add twenty-five (25) parts of sodium acetate, then fill up with water to fifteen hundred (1500) parts. Keep the temperature at 0° centigrade then run this liquid into a solution of about twenty (20) parts of the sodium salt of 2:7-naphthol-sulfonic acid in three thousand (3000) parts of water at 0° centigrade containing about eleven (11) parts of caustic soda lye of 35% NaOH, stir well and allow to stand. Then heat up, filter, press and dry. In this way my new coloring matter is obtained in the form of its sodium salt. In order to produce the free acid, the sodium salt may be treated, before drying, with acids, for instance diluted hydrochloric acid and then filtered and washed until neutral. In order to obtain the new coloring matter in the form of its metallic salts or lakes the sodium salt or free acid of the dye may be treated with salts of the respective metal either before or after washing. If desired these combinations may be made in the presence of a substratum or base as now used in the manufacture of lakes, for instance, barium sulfate, whiting, aluminum hydroxid, or the like.

For dyeing or calico printing my new azo dye can be produced directly on the fiber. It is valuable for this character of work as it does not sublime.

Having described my invention, what I claim and desire to secure by Letters Patent of the United States, is:

1. As a new article of manufacture, the mono-azo coloring matter obtained by diazotizing alpha-naphthylamin and combining the diazo compound thus obtained with 2:7-naphthol-mono-sulfonic acid, forming when dried, a dyestuff of a dark red color which is insoluble in water but is soluble in concentrated sulfuric acid, changing when so treated to a dark blue color but which yields, on suitable reduction, alpha-naphthylamin and amino-2-naphthol-7-sulfonic acid, substantially as set forth.

2. As a new article of manufacture, the lakes employed as coloring matter containing a mono-azo dyestuff derived from diazotized alpha-naphthylamin and 2:7-naphthol-mono-sulfonic acid which by treatment with reducing agents yield alpha-naphthylamin and amino-2-naphthol-7-sulfonic acid, substantially as set forth.

ALBERT EDWARD GESSLER.

Witnesses:
  A. A. SMITH,
  ROBERT J. PULLAR.

Copies of this patent may be obtained for five cents each, by addressing the "Commissioner of Patents, Washington, D. C."